United States Patent

[11] 3,609,531

| [72] | Inventor | Friedrich M. O. Förster<br>Der Schoene Weg 144, 741 Reutlingen, Germany |
|---|---|---|
| [21] | Appl. No. | 677,990 |
| [22] | Filed | Oct. 25, 1967 |
| [45] | Patented | Sept. 28, 1971 |

[54] COMBINED LEAKAGE FIELD AND EDDY CURRENT FLAW DETECTOR
15 Claims, 6 Drawing Figs.

| [52] | U.S. Cl. | 324/37 |
|---|---|---|
| [51] | Int. Cl. | G01r 33/12 |
| [50] | Field of Search | 324/37, 40 |

[56] References Cited
UNITED STATES PATENTS

| 1,946,196 | 2/1934 | Drake et al. | 324/37 |
|---|---|---|---|
| 2,729,785 | 1/1956 | Keevil | 324/37 |
| 3,271,664 | 9/1966 | Mountz et al. | 324/37 |
| 3,340,466 | 9/1967 | Ono | 324/40 |
| 3,371,272 | 2/1968 | Stanton | 324/34 |
| 3,401,332 | 9/1968 | McClurg et al. | 324/37 |
| 3,430,134 | 2/1969 | Flaherty et al. | 324/40 |

*Primary Examiner*—Rudolph V. Rolinec
*Assistant Examiner*—R. J. Corcoran
*Attorney*—Dan R. Sadler

ABSTRACT: A nondestructive testing system is disclosed herein and more particularly to means for simultaneously measuring two different characteristics of a workpiece at the same point. In the embodiments of the invention disclosed herein this is accomplished by providing a pickup probe for scanning the workpiece and substantially simultaneously sensing any fields which are reradiated from eddy currents produced in the workpiece by the probe and any magnetic stray fields produced as a result of magnetizing the workpiece. Means are also provided which are responsive to these fields for indicating whether the fields are produced by defects in the surface scanned by the probe or defects buried beneath the surface.

Friedrich M.O. Förster,
INVENTOR.

Friedrich M. O. Förster,
INVENTOR.
BY.
Don R Sadler
ATTORNEY.

COMBINED LEAKAGE FIELD AND EDDY CURRENT FLAW DETECTOR

In nondestructive testing systems the workpiece may be scanned by a pickup probe to determined whether there are any objectionable defects. In addition to determining whether or not there are any defects present, it is desirable to determine whether the defect is small enough to be within an acceptable range or is so large as to require rejecting the workpiece. In addition, it is desirable to indicate the location of the defect, i.e. whether it is in the surface or buried inside of the workpiece.

In the so-called eddy current type of system the surface of the workpiece is exposed to a high frequency magnetic field. This produces eddy current which circulate on the surface or in a very thin region immediately adjacent the surface. If the workpiece is homogenous the eddy currents will follow a uniform pattern. In the event there is a discontinuity, such as a crack, etc., in the region where the eddy currents are circulating they are disturbed from their normal pattern. By measuring the fields reradiated from these eddy currents it is possible to locate the discontinuity. However, the eddy currents only flow in or near the surface and defects even a short distance beneath the surface do not materially alter the eddy current patterns. As a consequence although eddy currents are effective to locate surface cracks they cannot be used to locate defects which are buried deep beneath the surface.

In magnetic testing systems the workpiece is magnetized whereby a magnetic field is produced above the surface of the workpiece. If the workpiece is homogeneous and free from discontinuities the magnetic field adjacent the surface of the workpiece will also be essentially homogenous and free from any discontinuities. However, if there is a discontinuity such as a crack, void, inclusions, etc., there will be a corresponding disturbance in the stray field above the surface of the workpiece even though the discontinuity is deep within the workpiece. By scanning the surface of the workpiece with a suitable probe it is possible to locate variations in the stray fields and identify the presence of a defect in the workpiece. The magnitude of the disturbance in the field is not only a function of the size of the defect but also the depth of the defect below the surface. When a stray field is detected above the surface of a workpiece, such as a pipe, it is not known whether the field is produced by a defect on the outside surface or on the inside surface. As a result with workpieces of this nature it has been extremely difficult, if not impossible, to determine the size of the discontinuity or its location by merely measuring the intensity of the stray flux field. For example, it cannot be readily determined whether a small disturbance in the magnetic field is produced by a small and acceptable discontinuity on the exterior surface or a very large and objectionable defect buried deep within the workpiece.

It can thus be seen that although prior eddy current and magnetic types of nondestructive testing systems have been capable of locating defects, they have not been capable of accurately and reliably resolving the size and location of a defect, particularly where the defect has been buried deep beneath the front or exterior surface being scanned.

The present invention provides means for overcoming the foregoing difficulties. More particularly, means are provided for inspecting a workpiece at high rates of speed and automatically determining the location and depth of the discontinuity and whether it is small enough to be within an acceptable range or is so large as to be an objectionable defect. This is accomplished by providing a pickup probe capable of simultaneously measuring the amount of disturbances in the eddy current and magnetic stray flux fields at a common point and together with a system for comparing these two signals and resolving whether the defect is on or near the outer surface and indicate the size of such a defect.

In the present invention this is accomplished by providing a pickup probe having at least one annular ring or core of a magnetic material, such as ferrite. A first primary winding produces a concentric flux field within the core and a second primary produces a field extending diametrically across the core so as to extend into the surface of the workpiece and produce eddy currents. A secondary is wrapped diametrically around the core to sense any changes resulting from any stray fields combining with the concentric flux field produced by the first primary and to sense the fields reradiated from any eddy currents produced within the workpiece by the second primary. As a result two signals are simultaneously obtained from the same area of the workpiece whereby they may be compared and the characteristics of said area determined.

These and other features and advantages of the present invention will become apparent from the following detailed description of a limited number of embodiments thereof, particularly when taken in connection with the accompanying drawings wherein like reference numerals refer to like parts and wherein.

Figure 1:
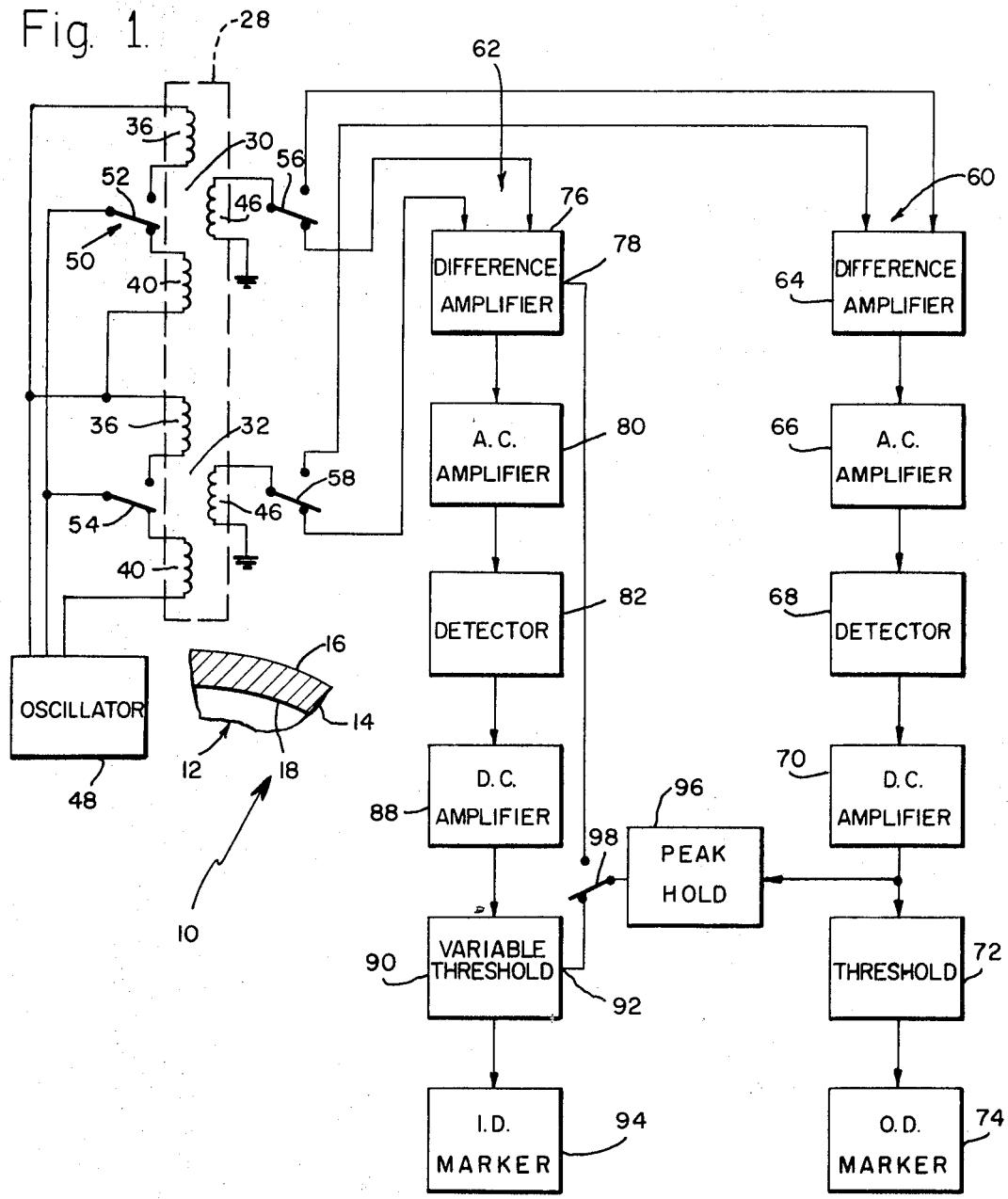
FIG. 1 is a block diagram of a nondestructive testing system utilizing the present invention.
Figure 2:
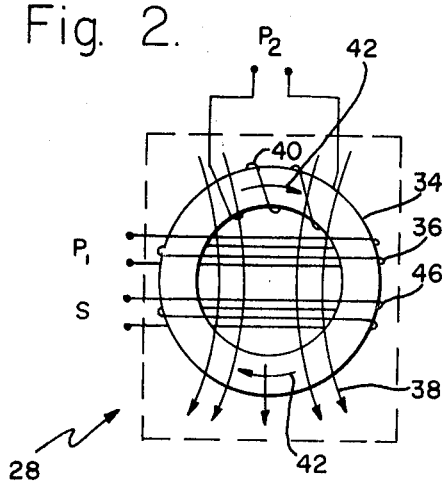
FIG. 2 is a front view of the pickup probe utilized in the system of FIG. 1.
Figure 3:
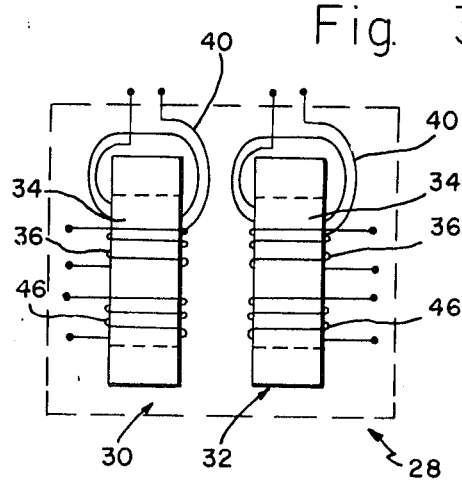
FIG. 3 is a side view of the pickup probe of FIG. 2.

Referring to the drawing in more detail the present invention is embodied in an inspection system 10 for locating defects in workpieces. Although the system 10 may be used for inspecting any type of workpiece, in the present instance it is particularly adapted for inspecting workpieces that are relatively long, such as bars, rods, etc.

More particularly this system 10 is especially useful for inspecting workpieces such as hollow pipe 12 having a generally cylindrical shape. The pipe 12 includes a wall 14 of ferromagnetic material and has a substantially uniform thickness. The wall 14 has an external or outside surface 16 and an internal or inside surface 18.

Figure 6:
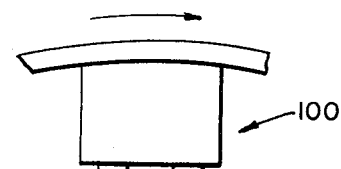
FIG. 6 is a fragmentary cross-sectional view of a workpiece and another form of pickup probe for scanning the workpiece.
Figure 6:
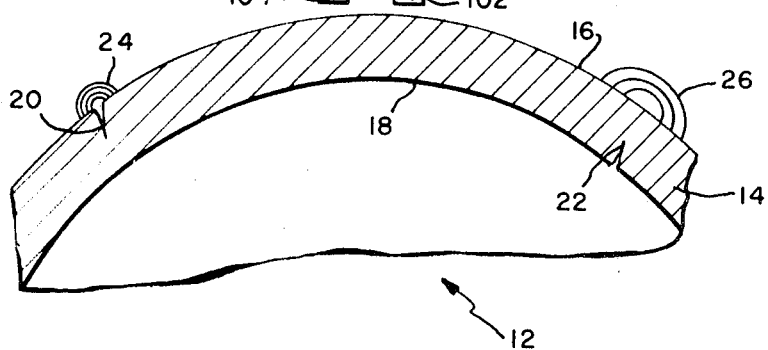

In a high quality or ideal pipe the entire wall is essentially homogenous and uniform throughout. There are no irregularities or discontinuities in the wall, nor variations in the thickness. However, as a practical matter, under certain circumstances, for example as a result of a faulty manufacturing process, cracks, etc., may develop in the wall of a pipe. The most common types of cracks are shown in FIG. 6. One type of crack 20 (i.e. an outside defect) extends inwardly from the outer surface 16. The other type of crack 22 (i.e. an inside defect) extends outwardly from the inner surface 18.

Many pipes are not heavily stressed and relatively minor and small cracks of either the inside or outside variety may be tolerated. This is particularly true if the pipe is graded for low stress applications.

Under some circumstances, for example when the pipe is to carry high-pressure fluids, it is necessary for the pipe to be highly stressed. In this event cracks of even relatively small depths are objectionable as they may lead to a catastrophic failure of the pipe. Normally the critical dimension of a crack is its depth, i.e. the extent to which it penetrates the wall. Accordingly to some standards even very shallow cracks in the surface must be repaired or the pipe rejected. A more commonly employed standard permits classifying the pipe as acceptable if it does not contain any cracks or other types of defects having depths in excess of some limit, such as 12½ percent of the thickness of the wall. If a crack on either the inside or the outside exceeds this depth it is necessary to reject the pipe, repair the crack and/or downgrade the pipe into a category where it will be very lightly stressed.

If the pipe 12 passes between the pole faces of a magnet, or if a current is circulated axially through the pipe, a magnetic field will extend circumferentially around the wall of the pipe. If the wall 14 of the pipe 12 is homogenous, the magnetic field within the wall 14 and immediately above the surface 16 will be homogenous. However, in the event there is a discontinuity in the pipe 14 there will be a resultant perturbation in the field, particularly that portion of the field just above the surface 16. This is commonly referred to as a stray magnetic field.

As best seen in FIG. 6, a crack 20 in or very near the outside surface causes a stray field 24 on the outside of the pipe having a relatively large intensity with very high radial and circumferential gradients. Also the geometric shape of this field 24 is relatively small. When the crack 22 is on or near the inside surface 18 (i.e. remote from the outside surface 16) the resultant stray field 26 on the exterior of the pipe 12 has a relatively small intensity and lower radial and circumferential gradients. Also, the field 26 has a larger geometric shape and covers a wider area of the pipe.

It is not unusual for a given size crack 20 on the outside surface to produce a stray field 24 having an intensity on the order of up to say 5 times as great as the intensity of the field 26 produced by an inside crack 22 of identical size. Under these circumstances an insignificant outside crack of say 5 percent depth will produce a field of about the same intensity as a major inside crack of say 25 percent depth. By merely measuring the intensity of the field it is extremely difficult, if not impossible, to determine whether it is caused by a small outside crack of acceptable depth or a large internal crack of sufficient depth to require a rejection of the pipe.

The present system 10 is capable of measuring the stray fields 24 and 26 around the pipe 14, determining whether the crack producing the field is inside or outside and determining whether the depth of the crack exceeds a level requiring a rejection or repair of the pipe 14. More particularly the system 10 employs a probe 28 which is adapted to scan the surface 16 of the pipe 14 and pass through any stray fields.

This scanning may be accomplished in any desired manner. By way of example, the pipe 14 may be rotated and advanced axially past the probe 28. In the present instance the pipe 14 is slowly advanced axially through a test station while the probe 28 is carried circumferentially around the pipe 14 at a considerably higher velocity. This will result in the probe 28 scanning the entire exterior 16 of the pipe 14 in a spiral pattern.

The probe 28 is adapted to substantially simultaneously measure both the stray fields around the pipe 14 and the eddy currents. The probe 28 may include a single transducer to measure these values at a single point so as to give an absolute measurement. This type of operation may be desirable for some purposes. However, the present probe 28 includes two slightly separated transducers 30 and 32 for measuring both the stray field and eddy currents at slightly separate points. This permits developing a difference signal corresponding to the difference at the two points or the gradient over the distance between the two points.

The two transducers 30 and 32 are substantially identical to each other. Each includes an annular ring or core 34. The cores may be fabricated in any desirable manner from any desirable material. Normally the core 34 includes a ferrite having a high permeability whereby a relatively small coercive force will produce a relatively large flux field within the core. Moreover if the probe 28 passes through a stray field a relatively large flux field will occur in the core 34. It is also desirable for the core 34 to have low hysteresis losses and a short response time. Preferably the core 34 has a relatively low saturation whereby a relatively low coercive force will saturate the core.

A first primary winding 36 is wrapped around the entire core 34 generally parallel to the surface of the pipe 12. It is to be noted this winding 36 encompasses both of the diametrically opposite sides of the core 34. When a current circulates through this primary winding 36 a field 38 is created which projects or extends beyond the bounds of the core 34 and into the surface 16. Normally this field 38, as indicated by the group of arrows, is substantially symmetrical. This winding 36 is used primarily in connection with measurement of the eddy currents.

A second primary winding 40 is only wrapped around one side of the core 34. When a current circulates in that winding 40 it produces a flux field 42 which is substantially entirely inside of the core 34 and travels in a circumferential direction as indicated by the arrows. This winding 40 is used primarily in connection with the detection of the stray magnetic fields 24 and 26.

In addition a secondary winding 46 is provided on the core 34. This winding 46 is wrapped around the entire core 34 substantially parallel to the first primary winding 36, i.e. generally parallel to the surface 16. It encompasses both of the diametrically opposite sides of the core. This secondary 46 is utilized for detecting both the stray fields and eddy current effects.

The two primaries 36 and 40 are interconnected with a signal source such as an oscillator 48. Normally the first and second primaries 36 and 40 operate alternatively. Accordingly they may be coupled to the oscillator 48 by means of a double throw switch 50 having a separate first and second parts 52 and 54 for the transducers. This switch 50 is preferably of an electronic nature capable of operating at relatively high speeds. For example, the switch 50 may rapidly switch from one primary to the other and back again at intervals on the order of a few milliseconds.

When this switch 50 connects the first primary 36 with the oscillator 48, for example during odd intervals, magnetic field 38 is created and projected beyond the core 34 into the pipe 13, as indicated by the group of arrows. This is a relatively high frequency field and causes eddy currents of the same frequency to circulate in the pipe 12. Because of the frequencies these currents are confined to the surface 16 or very near the surface 16 and do not penetrate to any great depth. As the eddy currents circulate they reradiate fields extending above the surface 16 of the pipe 14. These reradiated fields extend through the core 34 and thereby induce signals in the secondary 46. These signals from the secondary 46 during these odd intervals have amplitudes, phases, etc., corresponding to the eddy currents in the pipe 14.

After a few cycles of the driving signals from the oscillator 48, i.e. during the even intervals, the switch 50 reverses to the other position whereby the driving signal now passes through the second primary 40. The high frequency driving field now extends circumferentially around the core 34 as shown by the arrows. If the core 34 is disposed in the stray field 24 or 26, the stray field in one side of the core 34 will add to the driving field while the stray field in the other side will subtract. If the driving field saturates the core 34 over a major portion of each half cycle there will be a short interval at 0° and at 180° when the driving field in the core 34 reverses direction and the core 34 is momentarily unsaturated.

If the core 34 is not in a stray field the saturation and unsaturation of the two sides will occur symmetrically in the opposite sides of the core 34. Any signals produced in the secondary 46 will be symmetrical and cancelled out. However, if the core 34 is in a stray field, the side where the stray and driving fields are opposed will unsaturate and reverse polarity first. In the opposite side where the two fields add the unsaturation and reversal of the field will occur later. As a result the reversals in the two sides no longer occur simultaneously nor symmetrically. Therefore, a pulse is produced in the secondary 46. This occurs each time the driving field reverses polarity whereby the signal in the secondary 46 is a second harmonic.

During the even intervals the secondary 46 produces a signal which is the second harmonic of the driving signal from the oscillator 48. The polarity or phase of this signal is dependent upon the direction of the stray field 24 or 26 and its magnitude is dependent upon the magnitude of the stray field. A probe utilizing this type of operation is disclosed and described in more detail in copending application Ser. No. 661,458 in the name of Friedrich M.O. Förster, filed Aug. 17, 1967, now abandoned.

Although the secondary windings 46 of the two transducers 30 and 32 may be coupled directly to any suitable electronics, in the present instance they are coupled to third and fourth parts 56 and 58 of the switch 50. These parts 56 and 58 of the switch 50 operate in synchronism with the first and second parts 52 and 54 to alternately switch the secondary windings 46 between a first channel 60 and a second channel 62 during the odd and even intervals respectively.

It may be seen the switch 50 in essence provides a time-sharing multiplex system. During odd intervals the switch 50 is in a first condition, the secondaries 46 produce signals corresponding to the eddy currents and these signals are coupled to the first channel 60. During even intervals the switch 50 is in a second condition, the secondaries 46 produce signals corresponding to the stray fields and these signals are coupled to the second channel 62.

If the multiplexing produced by the switch 50 operate at a relatively high speed compared to the speed at which the probe 28 scans the pipe 12, the probe 28 will not move a significant distance during one interval. Accordingly, the signals coupled to the two channels 60 and 62 will correspond to both the eddy current and magnetic fields at substantially identical areas in the pipe 14.

The first channel 60 determines the characteristics of the pipe 12 by measuring the eddy currents. If the probe 28 includes only a single transducer, the switch 50 will be connected to the input of a single-ended AC amplifier. Such an amplifier would then increase the amplitude of the signal to a more useful level and improve the signal-to-noise ratio. The amplified signal would then be a function of the absolute value of the eddy currents. This type of arrangement is useful where the absolute value of the characteristic is important.

However, the present system 10 is particularly adapted for locating small irregularities such as cracks. Accordingly the probe includes a pair of transducers 30 and 32 and a pair of secondaries 46, so as to determine the gradient or changes between two adjacent points. Accordingly, the first sides of the third and fourth parts 56 and 58 of the switch 50 are connected to the two inputs of a double-ended or difference amplifier 64. This amplifier 64 responds to the difference of the signals on the two inputs. If the two signals are identical there is no difference and no output signal and the absolute values are cancelled out. As a consequence the signal from the difference amplifier 64 will be a function of only the gradient of the eddy currents occurring over the distances between the two transducers 30 and 32. When the transducers 30 and 32 are on opposite sides of the crack 20 the eddy currents are greatly distorted and a large signal occurs.

Normally the output from the difference amplifier 64 is interconnected with an AC amplifier 66 whereby the amplitude of the difference signal is increased to a more useful level and the signal-to-noise ratio improved. The output from the AC amplifier 66 is in turn connected to a detector 68 which may be of conventional design.

Figure 4:
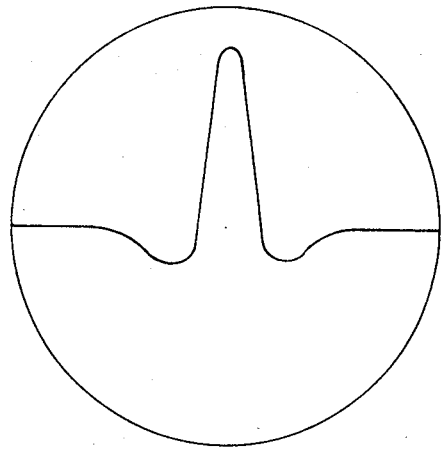
FIGS. 4 and 5 are oscillograms showing the signals produced in the system under certain different operating conditions.

The exact characteristics of the detector 68 are, of course, dependent upon the nature of the signals produced by the AC amplifier 66. Normally this signal includes a carrier wave having a frequency corresponding to the frequency of the driving signal from the oscillator 48. The amplitude (i.e. the envelope of the carrier wave) and the phase of the carrier wave will be a function of the characteristics of the pipe 14 and the gradient of the eddy currents occurring over a distance equal to the spacing between the cores 34. The detector 68 is, therefore, effective to remove the carrier wave and also normally respond to the phase of the carrier. By way of example, this may be a phase-sensitive rectifier synchronized with the phase of the oscillator. When the carrier is removed a signal similar to the oscillogram of FIG. 4 is provided. As the leading transducer 30 approaches the crack 20 the leading edge of the eddy current pattern is disturbed whereby the signal is slightly negative. When the two transducers 30 and 32 are on opposite sides of the crack 20 the signal reaches a maximum positive value. The signal then is momentarily negative as the transducers 30 and 32 retreat from the crack 20. If the probe 28 passes over the crack 22 the eddy currents are not effected and no signal is produced.

It is to be noted the switch 50 operates on a time-sharing multiplexer basis. Accordingly the signal from the AC amplifier 66 will be "chopped" or broken into a series of pulses occurring during the odd intervals. During the even intervals the signal is at ground or zero level. Accordingly the detector 68 should be capable of responding to this condition and produce a DC or slowly varying signal having an amplitude which is a function of the envelope of the pulses during the odd intervals.

The output from he detector 68 is interconnected with an amplifier 70. Normally this is a DC amplifier 70, or at least has a sufficiently low frequency response to preserve the characteristics of a constant or very slowly varying signal. This amplifier 70 is effective to increase the amplitude of the detected signals to a more useful level and to improve the signal-to-noise ratio.

The output of the DC amplifier 70 is in turn coupled to a threshold or trigger circuit 72. This circuit 72 normally remains inoperative as long as the signal on the input is below some particular threshold level. When the amplitude of the signal on the input exceeds the threshold level the circuit 72 switches its condition and produces an output signal. The output signal persists for so long as the input remains above the threshold level.

The threshold level is normally set to correspond to the maximum acceptable defect. If the pipe 12 is free of any defects the signal will always remain below the threshold level and no signals will be produced at the output of the threshold circuit 72. If there is a discontinuity, such as a crack 20, the signal will rise above the threshold level and a signal will be produced.

Suitable output means, such as an alarm may be coupled to the threshold circuit 72. This will indicate the occurrence of a signal which exceeds the acceptable limit. In the present instance a marker 74, such as a paint spray gun is coupled to the threshold circuit 72. Whenever the threshold circuit 72 produces a signal the spray gun marks the pipe 12 to indicate that an objectionable defect is present.

The eddy currents only circulate on or very near to the outside surface 16 of the pipe 12. As a result if there is a signal it must be caused by a defect 20 in this thin region. Any defects buried deep below the surface 16 will not effect the eddy currents and will not cause the threshold 72 to switch. Accordingly, the marker 74 may have a peculiar color, such as red, to indicate the defect 20 is actually located in or very near to the outside surface 16. It is to be noted this will indicate the presence of very shallow cracks, for example on the order of 1 percent or less of the wall thickness. If shallow cracks are not of interest this marker 74 may be omitted.

The second channel 62 is very similar to the first channel 60 except it is responsive to the stray flux fields 24 and 26, rather than eddy currents. Here again if the pickup probe 28 includes only a single transducer the switch 50 would connect the secondary winding to a single ended AC amplifier whereby an absolute value signal would be produced.

In this instance the probe 28 includes a pair of transducers 30 and 32 and a pair of secondaries 46. Accordingly, the third and fourth parts 56 and 58 of the switch 50 are connected to a double ended or difference amplifier 76, similar to the first difference amplifier 64. The absolute values of the signal are cancelled out and a signal corresponding to the difference or gradient of the field is provided. As explained subsequently, the gain of this amplifier 76 may be either constant or variable and controlled by the amplitude of the signal present in the input 78. For example, the gain will be at a high value when there is a signal on the input 78 and at a low value when there is not a signal.

Normally the output from the difference amplifier 76 is interconnected with an AC amplifier 80 which increases the amplitude of the difference signal to a more useful level and thereby improve the signal-to-noise ratio. The output from the AC amplifier 80 is in turn connected to a detector 82.

This detector 82 may be of conventional design and similar to the detector 68, in the first channel 60. However, it is to be noted there are several differences in the two signals. First of all this is a second harmonic signal whereby the carrier wave has a frequency double the frequency of the driving signal from the oscillator 48. Normally the phase of the signal is of little or not interest and accordingly it is not necessary to have any form of phase-sensitive rectification. The switch 50 chops or breaks the signal into a series of pulses occurring during the even intervals. Accordingly the detector 82 should be capable of responding to this pulsed type of signal and produce a DC or slowly varying signal having an amplitude which is a function of the envelope of the pulses during the even intervals.

Figure 5:
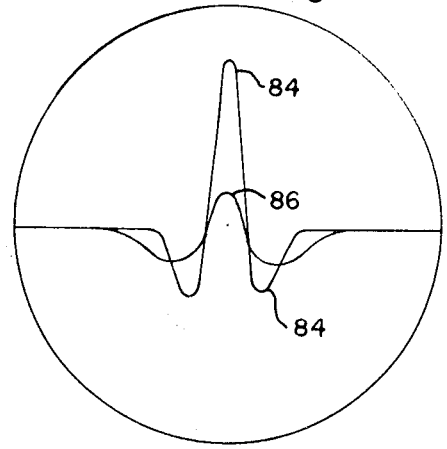

This signal will resemble the oscillogram of FIG. 5. More particularly, as the probe approaches the crack 20 or 22 the signal will momentarily be negative. The signal will then become positive, reaching a peak as the probe passes over the crack, and then become negative and return to zero. When the crack 20 is at the surface of the field 24 is narrow and intense. The probe will, therefore, pass through the field very quickly and produce a large signal. This results in the oscillogram 84 having a large positive pulse that is very narrow.

When the probe 28 passes through the field 26 it will take a longer time and the signal will be smaller. This results in an oscillogram 86 which is lower and broader than for a surface crack 20. By way of example the oscillogram 84 may be on the order of five times as high as oscillogram 86 for the same size crack.

A DC amplifier 88 is coupled to the output from the detector 82 to increase the amplitude of the detected signals to a more useful level and to improve the signal-to-noise ratio. The output of the DC amplifier 88 is in turn coupled to the input of a trigger or threshold circuit 90. This circuit 90 is similar to the first threshold circuit 72 in that it will not produce an output signal as long as the signal on the input is below some particular threshold level but will provide an output when the input rises above the threshold level.

As explained below, this threshold level may be varied as the signal on the control input 92 varies. For example, when there is a signal present on the input 92 the threshold is set at a high level corresponding to a signal produced by an outside crack 20 of maximum acceptable size. When there is a signal present on the input 92 the threshold is set at a lower level to correspond to the signals produced by a crack 22 on the inside of maximum depth.

A marker 94, such as a paint spray gun, is coupled to the threshold circuit 90. However, any other type of output means, such as an alarm, etc., may be used. When the threshold circuit 90 produces a signal, the spray gun becomes operative and marks the pipe 12 to indicate the presence of an objectionable defect. This marker may be of a second distinctive color, such as green to distinguish from the first marker 74.

A peak hold circuit 96 is coupled to the output of the DC amplifier 70 in the first channel 60. The output of the peak hold 96 is coupled to a single pole double throw switch 98, one side of which leads to the control input 78 of the differential amplifier 76 and the other side of which leads to the control input 92 of the variable threshold 90. The peak hold 96 may be of any conventional-type circuit capable of producing a constant amplitude signal for a predetermined time interval whenever a signal in excess of a particular level occurs on the input.

Each time the probe 28 passes over a surface crack 20 a signal will be produced at the output of the DC amplifier 70. This signal will cause the peak hold 96 to produce a signal even through the threshold circuit 72 may not trigger the marker 74. This signal will persist for a short period of time, for example the timer required for several revolutions of the probe 28.

When the switch 98 is in the first position the peak hold 96 is coupled to the difference amplifier 76. In the event a surface crack 20 is present a signal is coupled from the first channel 60 through the peak hold 96 to the control input 78. As pointed out before, a surface crack 20 will produce a stray field with a high intensity. Therefore, signal on the control input 78 reduces the gain of the amplifier 76. When there are no surface cracks 20, any stray fields 26 result from internal cracks 22 and are relatively weak. Under these circumstances the absence of a signal will allow the amplifier 76 to have a high gain. The amplitude of the signals from the amplifier 76 will be a substantially constant function of the depth of the crack 20 or 22 whether it is on the inside 18 or the outside 16. This allows the reject level for the threshold 90 to remain substantially constant.

When the switch 98 is set in the second position the signal from the peak hold 96 is coupled to the control input 92 of the variable threshold 90. Under these conditions the gain of the amplifier 76 remains constant and the amplitudes of the signals coupled to the input of the threshold 90 are a constant function of the stray field strength. Since the presence of a signal on the peak hold 96 means a surface crack 20 is present, this signal raises the threshold to a level corresponding to a surface defect of maximum acceptable size. In the absence of a signal from the peak hold 96, the threshold level is reduced to correspond to the lower level signals resulting from an inside crack 22.

It can be seen regardless of the position of the switch the second channel will not produce an indication of a defect unless there is a crack in excess of the acceptable limit. Even through a small outside crack may produce a stray field of greater intensity than an objectionable inside defect, the signal from the peak hold will condition the second channel to prevent marking the pipe 12 under these circumstances.

In order to utilize this embodiment a workpiece, such as the pipe 12, may be first magnetized by circulating an electric current axially therethrough or otherwise producing a circumferential magnetic field. The pipe 12 is then advanced past the probe 28 while the probe 28 scans around the pipe 12 and passes through any stray fields. During the odd intervals the switch 50 connects the oscillator 48 to the first primaries 36 and the secondaries 46 to the first channel 60. During the even intervals the switch 50 reverses and connects the oscillator 48 to the second primaries 40 and the secondaries 46 to the second channel 62.

During the odd intervals the first primaries 36 are being driven so as to induce eddy currents in or on the surface 16. If the probe 28 is disposed over a uniform portion of the surface 16 the eddy currents will be undistorted and the signals from the secondaries 46 will be identical. As a result no signal is produced by the difference amplifier 64. However, if the probe 28 passes over a surface defect, such a crack 20, the difference amplifier 64 produces a signal and the first channel 60 responds to thereto. First of all the peak hold 96 will couple a signal to the difference amplifier 76 and/or the variable threshold 90 in the second channel 62. If the crack 20 is deeper than some predetermined limit the threshold 72 will actuate the outside defect marker 74.

During the even intervals the switch 50 reverses and the second primaries 40 are driven. It is to be noted that the odd and even intervals are relatively short compared to the movement of the probe 28 across the surface 16. As a consequence the probe 28 scans the outside surface 16 and detects stray magnetic fields 24 and 26 at substantially the identical spot the eddy currents are measured. If there are no surface defects 20 or buried defects 22, there will be no unbalanced signal from the difference amplifier 76. If there is a surface crack 20 there will be a large magnetic stray field 24 and a large amplitude signal will be created within the secondary 46 during the even intervals. However, the signal from he peak hold 96 will cause the gain of the difference amplifier 76 to be reduced and/or the threshold level of the threshold circuit 90 to be raised. In the event the surface crack 20 is within the acceptable limit the threshold circuit 90 will not be set and the ID marker 94 will not produce a mark on the pipe 12. Usually the crack 20 is of sufficient magnitude to actuate the OD marker 74. As a result the operator will know a surface crack 20 is present but since the ID marker 94 was not actuated the crack 20 is within acceptable limits.

In the event the surface crack 20 is of an objectionable depth both the thresholds 72 and 90 will be actuated and both the ID and OD markers 94 and 74 will mark the pipe 12. By observing two marks on the pipe 12 the operator will know there is a surface crack 20 and it is of objectionable magnitude.

In the event there are no surface cracks 20 and OD marker 74 will not operate and the peak hold 96 will not decrease the sensitivity of the second channel 62. If there is an inside crack 22 the second channel will have a high sensitivity (i.e. the gain of the difference amplifier 76 will be high and/or the threshold of the threshold circuit 90 will be low). If the inside crack 22 is within acceptable limits the threshold circuit 90 will not be set and it will not actuate the ID marker 94. If the crack 22 is of objectionable depth the signal from the difference amplifier 76 will be large enough to cause the marker 94 to mark the pipe. As a result, if the pipe 12 has a single mark corresponding to the ID marker, the operator will know there is an inside defect of sufficient depth to require rejecting the pipe 12.

It can be appreciated if the switch functions at a sufficiently high rate of speed the odd and even intervals will be relatively short and the probe 28 will not move a significant distance between the successive intervals. Accordingly both the eddy current and magnetic characteristics of the workpiece will be measured at substantially identical points.

As an alternative the embodiment of FIG. 6 may be used. This embodiment is substantially identical to the preceding embodiments except for the probe. In this embodiment a search unit 100 is provided for scanning the exterior of the pipe 12. The search unit 100 includes a first pickup probe 102 for measuring the eddy current effects and a pickup probe 104 for measuring the magnetic stray fields. These two probes are connected directly to a first or eddy current channel and a second or magnetic channel. These channels may be substantially identical to the channels 60 and 62 in FIG. 1. In this embodiment the switch 50 is eliminated and there is no multiplexing. As a consequence the eddy current signals and the stray field signals are substantially continuous, rather than pulsed. In addition, the eddy current probe 102 is normally positioned in front of the magnetic probe 104. It thereby scans the surface 16 the pipe 12 just before the magnetic probe 104. When the leading eddy current probe 102 passes over a surface crack 20 it will be effective to change the sensitivity of the second channel before the magnetic probe passes over the same crack 20. This arrangement permits a somewhat faster scanning rate than the first embodiment.

I claim:

1. A pickup probe for scanning the surface of a magnetized workpiece and measuring stray fields adjacent said surface in the region of discontinuities in the workpiece and measuring magnetic fields reradiated from eddy currents in said surface, said probe including the combination of
   a magnetic core,
   first means on said core for inducing said eddy currents in the surface of said workpiece,
   second means on said core for inducing a magnetic field within said core which combines with the stray field and the reradiated field to form a resultant field in the core, and
   third means on said core coupled to said resultant field to produce a corresponding electrical signal.

2. The pickup probe of claim 1 wherein
   said first means includes a primary winding for creating a magnetic field in said core which extends by the the workpiece and creates said eddy currents,
   said core is adapted to be disposed adjacent the workpiece to receive the magnetic fields reradiated by the eddy currents, and
   said third means is responsive to said received fields whereby said electric signal has a portion which is a function of the eddy currents.

3. The pickup probe of claim 1 wherein
   said core is adapted to be disposed adjacent the workpiece whereby at least a portion of the stray field is coupled in said core,
   said second means includes a primary winding for inducing the magnetic field in said core, said induced field combining with the portion of the stray field in said core to form a resultant field,
   said third means in responsive to the resultant field and is effective to produce a signal which includes a portion that is a function of the stray field.

4. The pickup probe of claim 1 wherein
   said first means includes a primary winding for creating a magnetic field in said core which extends into the workpiece and creates eddy currents,
   said core is adapted to be disposed adjacent the workpiece whereby at least a portion of the magnetic fields reradiated by the eddy currents extend into said core and at least a portion of the stray fields extend into said core,
   said second means includes a primary winding for inducing a magnetic field in said core, said induced field combining with the portion of the stray field in said core to form a resultant field,
   said third means is responsive to the reradiated field and the resultant field and is effective to produce a signal having a first portion which is a function of the eddy currents and a portion that is a function of the stray field.

5. A pickup probe for scanning the surface of a magnetized workpiece and measuring the stray fields adjacent the surface in the region of discontinuities in the workpiece and measuring the magnetic fields reradiated by the eddy currents in said surface, said probe including the combination of
   a core of magnetic material,
   a first primary coupled to said core and adapted to be connected to a source of an alternating driving signal whereby the core radiates an alternating field into the workpiece and induces eddy currents in said surface,
   said core being adapted to receive at least a portion of the magnetic stray fields adjacent the surface and also receive at least a portion of the magnetic fields reradiated by the eddy currents,
   a second primary coupled to said core for circulating a magnetic field in the core for combining with the portion of the stray field therein to create a resultant field, and
   a secondary on said core and coupled to the fields therein, said secondary being responsive to the resultant field and to the portion of the reradiated field in the core to produce a signal having a first part which is a function of the stray fields and a second part which is a function of the eddy currents.

6. The pickup probe of claim 5 wherein the core is an annular ring.

7. The pickup probe of claim 6 wherein
   the first primary is a winding which extends around the diametrically opposite sides of the ring and produces an alternating magnetic field which extends beyond the core, said core being adapted to be positioned adjacent the workpiece whereby said field extends into the workpiece and creates eddy currents and the fields reradiated by the currents extend into the core.

8. The pickup probe of claim 6 wherein
   the second primary is a winding which extends around one side of the ring and produces an annular flux field within the core, and
   said core being effective to receive at least a portion of stray field whereby the annular field and received portion of the stray field combine in the opposite sides of the core to form resultant fields within said core.

9. In a device of the class described for scanning the surface of a magnetized workpiece and measuring the stray magnetic fields adjacent said surface in the region of discontinuities in the workpiece and the magnetic fields reradiated by the eddy currents on said surface, said device including the combination of
   an annular core of magnetic material adapted to scan across the surface of the workpiece,
   a first primary winding on said core effective to create a magnetic flux field in said core which extends into the workpiece, a second primary winding on said core to produce an annular magnetic flux field within the core, a source of driving signals, means effective to intermittently couple said source to the first primary winding whereby said first primary winding is effective to radiate the magnetic field into the workpiece and induce eddy currents in the workpiece said means being effective to intermittently couple said source to the second primary winding whereby the annular field from the second primary produces a resultant field in he annular core, and a secondary winding on the core and coupled to the magnetic fields therein to produce a signal having a first part which corresponds to the eddy currents and a second part which corresponds to the stray fields.

10. The combination of claim 9 including
means for magnetizing said workpiece to produce stray fields adjacent the surface of the workpiece.

11. The combination of claim 9 including
means responsive to said signal to indicate the characteristics of said workpiece.

12. A nondestructive testing system for detecting discontinuities in a workpiece, said system including the combination of means for magnetizing the workpiece whereby stray fields are produced above the surface of the workpiece in the region of discontinuities in the workpiece, a ring core of magnetic material, a first primary winding on said core, a source of alternating driving signals connected to said primary winding to produce an alternating magnetic field, said primary winding being diametrically wound around said core whereby said alternating magnetic fields extends diametrically across said core and into the workpiece so as to induce eddy currents in said surface, said core being adapted to receive at least a portion of the magnetic field reradiated by said eddy currents and at least a portion of the magnetic stray fields, a second primary winding coupled to said core for circulating an annular magnetic field extending circumferentially around the core and combining with the stray fields in said opposite sides thereof to create resultant fields in said opposite sides, a secondary winding wound diametrically around said core and coupled to the difference between said resultant fields whereby said secondary winding produces an electrical signal having a first part corresponding to the eddy currents and a second part corresponding to the stray fields.

13. The nondestructive testing system of claim 12 wherein
said source of alternating driving signal is operative to create said eddy currents during certain intervals whereby said first part of said signal corresponding to the eddy currents occurs during said certain intervals and the second part of said signal corresponding to the stray fields occurs during other intervals.

14. The nondestructive testing system of claim 13 including
output means having a first portion responsive during said certain intervals to the first part of said signal and a second portion responsive during said other intervals to the second part of said signal.

15. A pickup probe for use in a nondestructive testing system for inspecting a workpiece having stray fields above the surface thereof in the region of discontinuities, said pickup probe including the combination of a ring core of magnetic material adapted to scan across the surface of the workpiece, a first primary winding on said core adapted to be connected to a source of driving signals, said winding being wound diametrically around said ring core whereby the magnetic flux field created by said driving signals extend diametrically through said core and into the workpiece to create eddy currents on the surface thereof, a second primary winding on said core adapted to be connected to a signal source, said secondary primary winding being effective to produce an annular magnetic flux field within the core, the magnetic field reradiated by said eddy current and said stray field extending through said core and forming resultant fields in the opposite sides of said ring core, and a secondary winding on said core disposed diametrically thereof and coupled to said resultant fields, said secondary winding being effective to produce a signal having a first part corresponding to the eddy currents and a second part corresponding to the stray fields.